United States Patent
Narayanan et al.

(10) Patent No.: US 11,905,127 B1
(45) Date of Patent: Feb. 20, 2024

(54) HELICAL CONTAINER CONVEYANCE SYSTEMS

(71) Applicant: Amazon Technologies, Inc., Seattle, WA (US)

(72) Inventors: Vivek S. Narayanan, Franklin, TN (US); Rajeev Dwivedi, Sammamish, WA (US); Ganesh Krishnamoorthy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

(21) Appl. No.: 17/577,895

(22) Filed: Jan. 18, 2022

(51) Int. Cl.
*B65G 47/68* (2006.01)
*B65G 35/06* (2006.01)
*B65G 21/20* (2006.01)
*B65G 47/248* (2006.01)
*B65G 47/94* (2006.01)
*B65G 47/96* (2006.01)

(52) U.S. Cl.
CPC ....... *B65G 47/683* (2013.01); *B65G 21/2063* (2013.01); *B65G 35/06* (2013.01); *B65G 47/248* (2013.01); *B65G 47/94* (2013.01); *B65G 47/962* (2013.01); *B65G 2201/025* (2013.01); *B65G 2207/24* (2013.01)

(58) Field of Classification Search
CPC .. B65G 47/683; B65G 21/2063; B65G 35/06; B65G 47/248; B65G 47/94; B65G 47/962; B65G 2201/025; B65G 2207/24
USPC .................................................. 198/402, 417
See application file for complete search history.

(56) References Cited

U.S. PATENT DOCUMENTS

| | | | | | |
|---|---|---|---|---|---|
| 2,121,365 | A | * | 6/1938 | Pardee, Jr. ............. | B65G 67/00 198/402 |
| 2,379,713 | A | * | 7/1945 | Hohl ...................... | B65G 35/00 198/417 |
| 3,729,108 | A | * | 4/1973 | Rice ........................ | B65B 21/22 198/402 |
| 3,874,740 | A | * | 4/1975 | Hurd ..................... | B65G 47/256 406/87 |
| 4,024,947 | A | * | 5/1977 | Knolle .................. | B65G 17/36 198/792 |
| 5,609,237 | A | * | 3/1997 | Lenhart ................ | B65G 47/248 198/417 |
| 11,034,524 | B2 | * | 6/2021 | Diehr ................... | B65G 41/003 |
| 2003/0051977 | A1 | * | 3/2003 | Egger .................. | B65G 47/248 198/405 |
| 2008/0203109 | A1 | * | 8/2008 | Workman ............ | B65G 47/248 221/199 |
| 2019/0062075 | A1 | * | 2/2019 | Bretz ................... | B65G 17/066 |

* cited by examiner

*Primary Examiner* — Mark A Deuble
(74) *Attorney, Agent, or Firm* — Eversheds Sutherland (US) LLP

(57) ABSTRACT

Systems, methods, and apparatuses are disclosed for helical container conveyance. In one embodiment, an example container conveyance system may include a set of rails having a first rail and a second rail, the set of rails configured to guide a container from an upright position at a first point along the set of rails to an inverted position at a second point along the set of rails. The system may include a drive mechanism configured to propel the container along the set of rails, and a conveyor disposed under a portion of the set of rails corresponding to the second point.

17 Claims, 9 Drawing Sheets

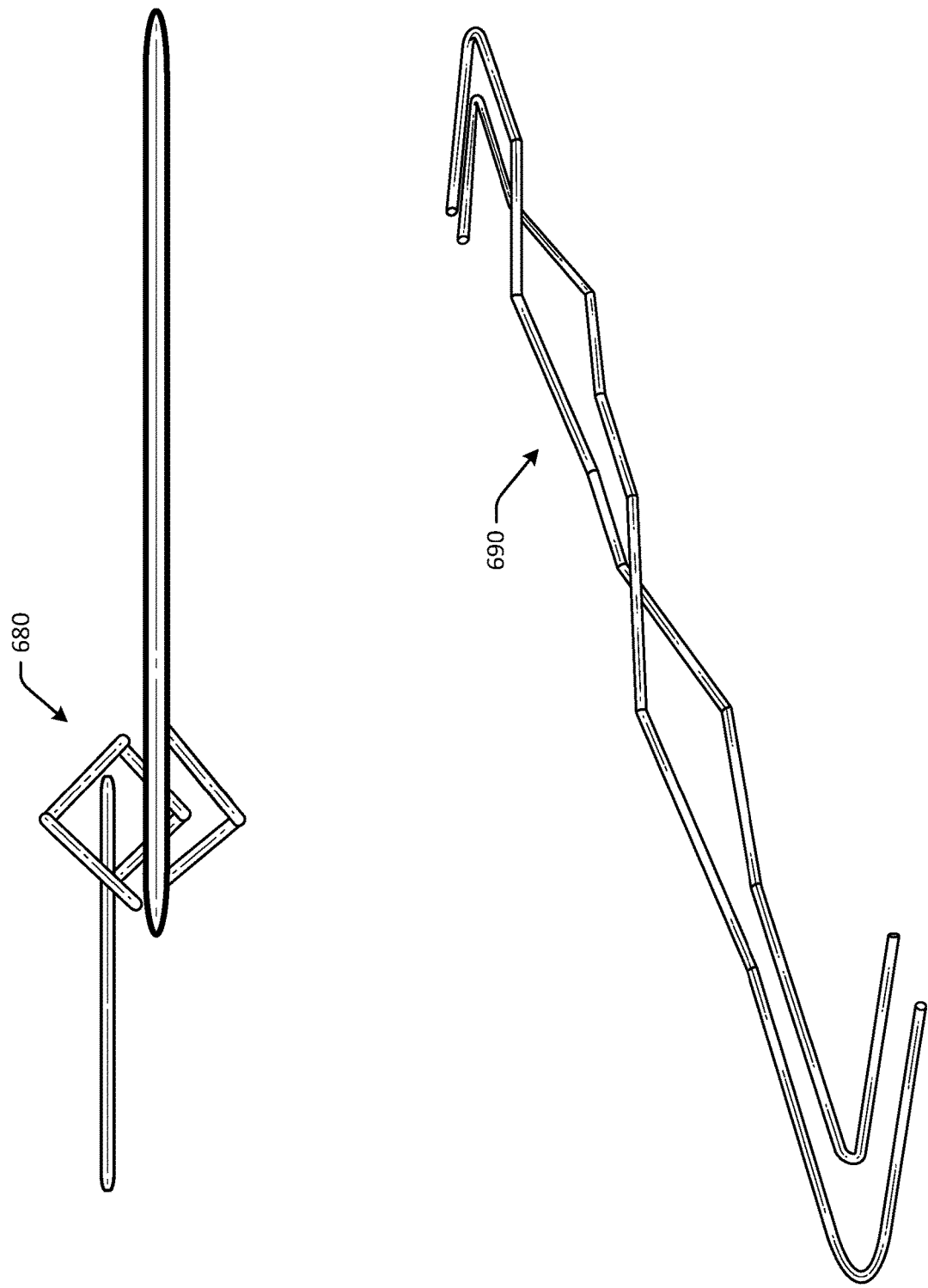

HELICAL CONTAINER CONVEYANCE SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

BRIEF DESCRIPTION OF THE DRAWINGS

FIGS. 6A-6B are schematic illustrations of rails of a helical container conveyance system without containers in accordance with one or more embodiments of the disclosure.

Figure 1:
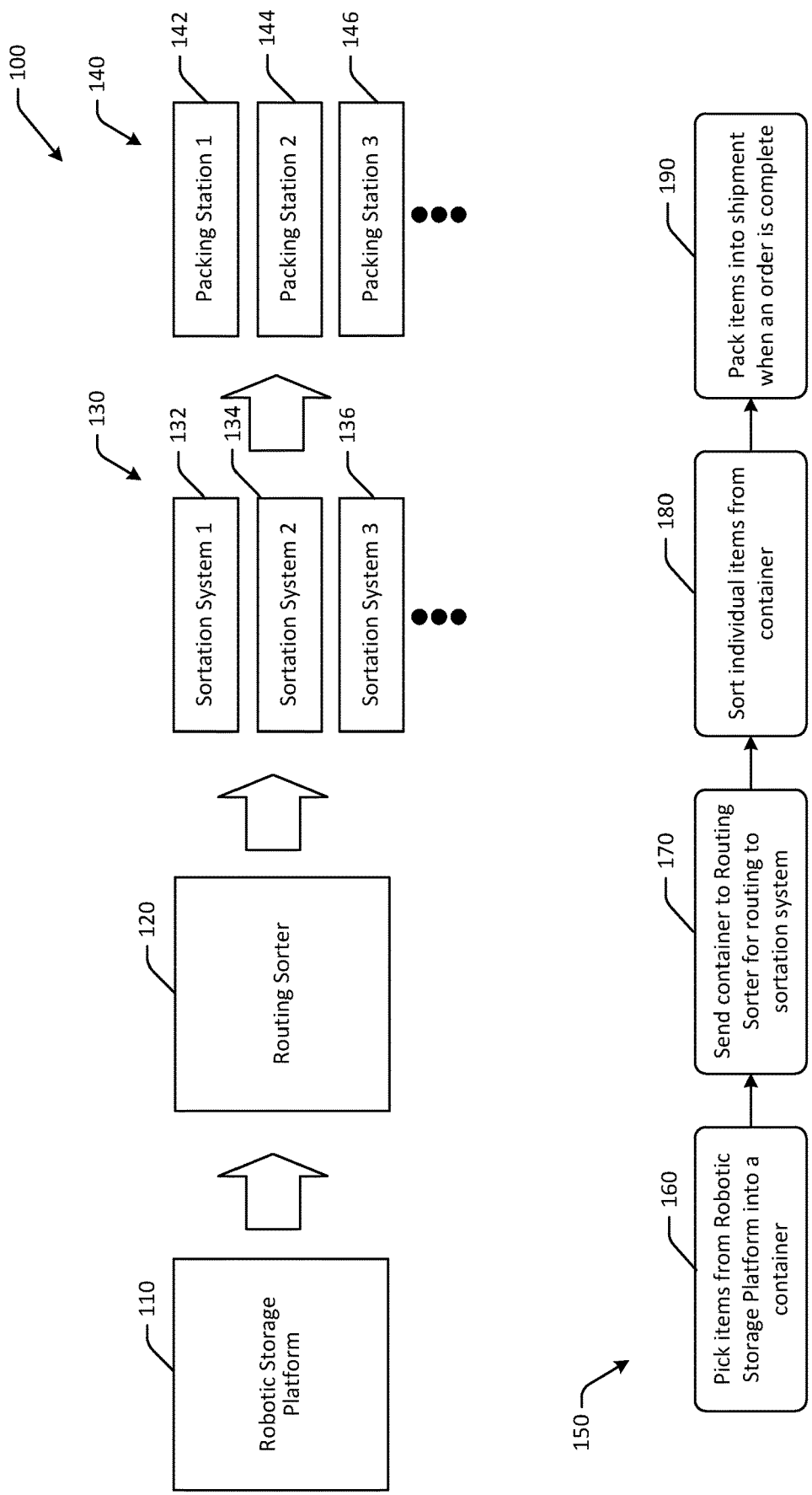
FIG. 1 is a hybrid schematic illustration of an example use case for helical container conveyance systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

During handling of items, items may be aggregated and transported in containers, such as totes. For example, totes may be filled with one or more items and routed to various destinations in a facility. At different points in the facility, the containers may be unloaded. Such unloading may be done manually or using automation, such as robots, where the contents of a container are dumped onto a conveyor or distribution surface (which may include conveyors disposed on autonomous vehicles, shuttles, etc.). During a dumping unloading process, the contents of the container may be at risk for damage depending on the distance between the item and the conveyor surface, as well as the other items in the container (e.g., heavy items falling onto soft items, etc.).

Embodiments of the disclosure include helical container conveyance systems that allow for automated unloading of containers while minimizing a risk of damage to items and increasing throughput due to continuous container movement. The systems and methods described herein may facilitate continuous unloading of containers via gradual rotation of a container from upright to upside down, so as to gradually unload the container and reduce a risk of damage to items. Some embodiments include an automated container movement system with guiderails along which containers can be moved during a continuous unloading process. Some embodiments include an inventory-handling system including an inventory unloader operable to empty out items from an inventory container. The techniques described herein may be implemented by any inventory-handling system, but particular examples described herein include an inventory-handling system with an inventory unloader that can receive inventory containers in a first end. The inventory containers can be carts or other containers that can hold and transport one or more items. The inventory containers can be received into the inventory unloader between guides (e.g., guide rails) and driven through the system by a drivetrain. The guides can be curved such that, when the inventory containers are driven from the first end of the inventory unloader to a second end of the inventory unloader, the guides rotate the containers. For example, the guides may cause the inventory containers to rotate from an upright orientation to an inverted orientation and back to an upright orientation. During rotation, the items can fall out of the inventory containers and onto an output conveyor to convey the items for further processing. For example, the items falling out of the inventory container may correspond to a bulk unloading of the inventory container at a significantly higher speed than if items were manually removed individually. At the second end of the inventory unloader, the inventory containers can be ejected from the inventory unloader.

Referring to FIG. 1, an example use case 100 for helical container conveyance systems and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote. Containers may be unloaded at one or more stages or locations at the facility using the helical container conveyance systems described herein.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Helical container conveyance systems as described herein may be used with any of the containers described with respect to FIG. 1. For example, the containers may be unloaded of items using helical container conveyance systems in a continuous unloading process.

Figure 2:
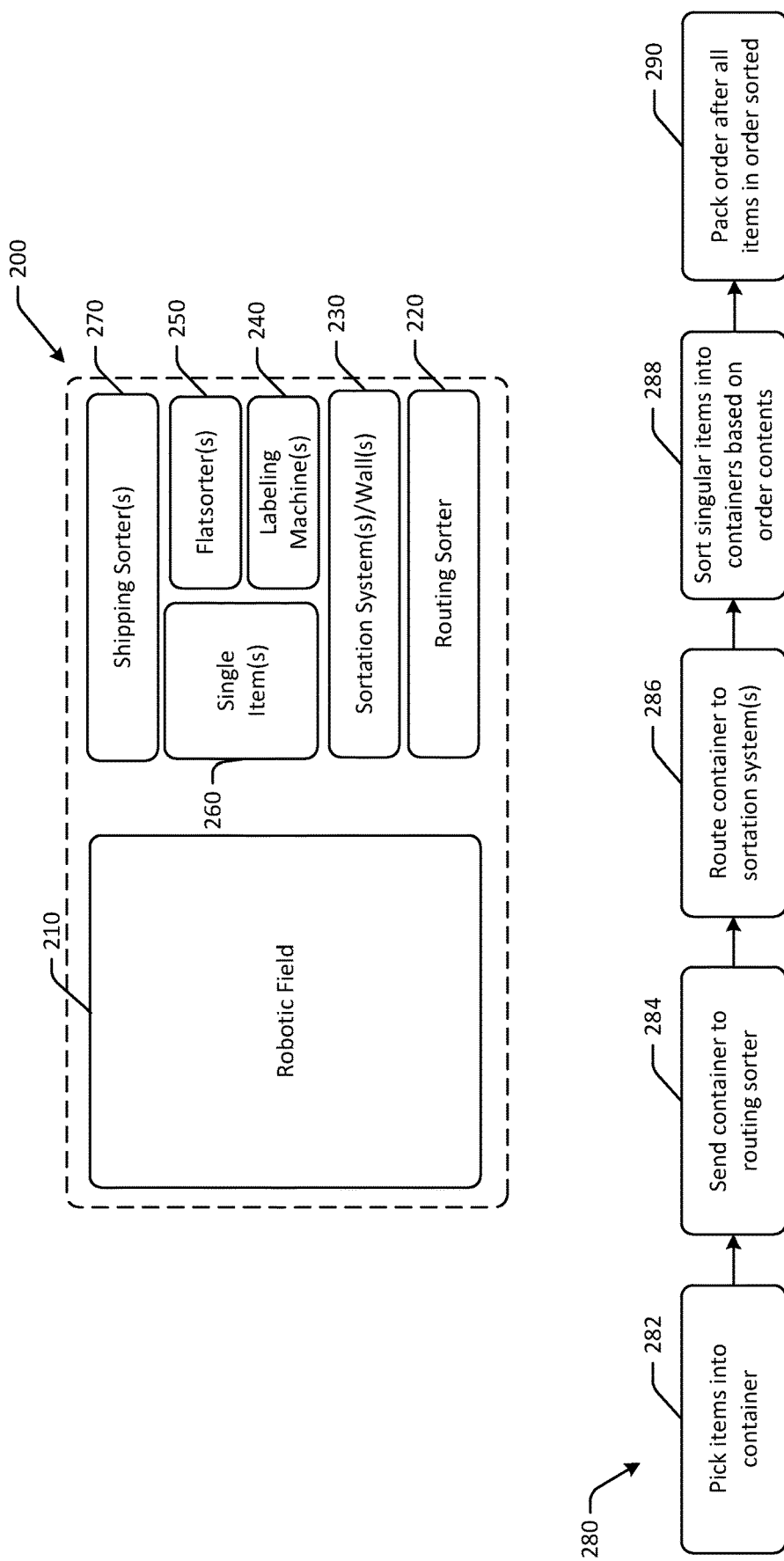
FIG. 2 is a hybrid schematic illustration of an example use case for helical container conveyance systems and an example process flow in accordance with one or more embodiments of the disclosure.

FIG. 2 is a hybrid schematic illustration of an example use case for helical container conveyance systems and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation system machines 220 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation system machines 220 may include multiple chutes, and may be configured to sort items at a rate of about 3,600 units per hour. In some instances, the sortation system machines 220 may have two inductors (e.g., one on each side, etc.) for inducting items from containers, and may be modular.

In some embodiments, the sortation system machines 220 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,500 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be sortation systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include helical container conveyance systems that can be deployed to rapidly unload contents from containers, such as containers removed from sortation systems prior to packing of items. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
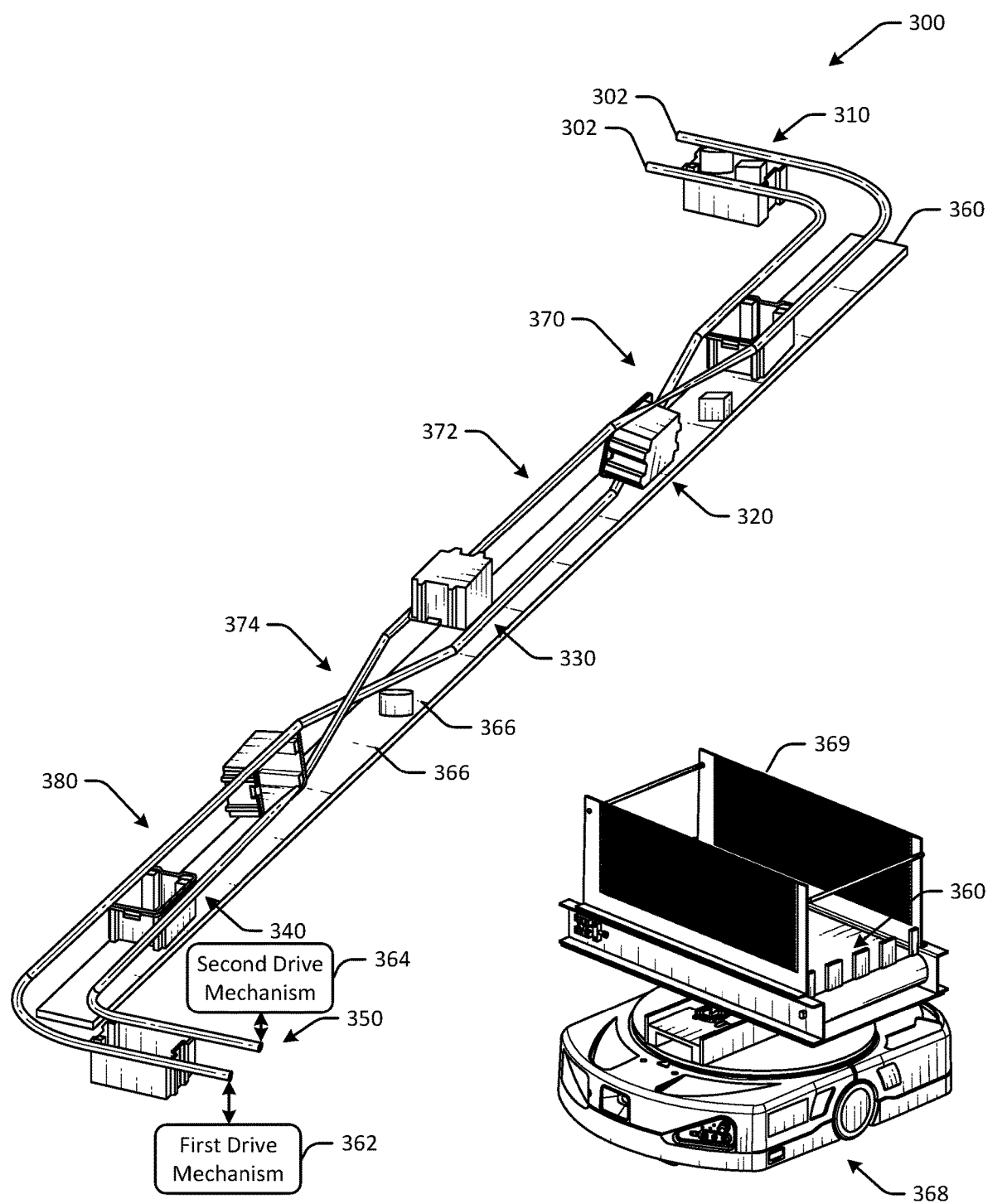
FIG. 3 is a schematic illustration of a helical container conveyance system in accordance with one or more embodiments of the disclosure.

FIG. 3 is a schematic illustration of a helical container conveyance system 300 in accordance with one or more embodiments of the disclosure. Other embodiments may include additional or fewer components. The illustration of FIG. 3 is not to scale, and may not be illustrated to scale with respect to other figures. The helical container conveyance system illustrated in FIG. 3 may be the same helical container conveyance system discussed with respect to FIGS. 1-2.

In FIG. 3, the helical container conveyance system 300 may include a set of rails 302. The set of rails 302 may guide a container 310 along a path, where the container is rotated from an upright position to an inverted position and optionally back to an upright position. To rotate the container 310, the set of rails 302 may have a helical structure.

As the container 310 moves along the path formed by the set of rails 302, material from the container 310 may be transferred onto a conveyor 360, such as a sorting and distribution surface (e.g., conveyors, autonomous vehicles, cross-belt shuttles, etc.), in a gradual manner. As a result, mechanical impact of items within the container may be prevented, as well as during the transfer process. Embodiments may therefore provide reliable manipulation of containers to enable gentle transfer. Container features on the container, such as a container lip, may engage with features on the set of rails 302. The constraint between the two features can be used to gradually turn as the container as it moves along the conveyance segment. As the container 310 moves along the conveyance segment the items are gently transferred onto the takeaway surface. Once the items are discharged onto the conveyor surface, the end effector on the spiral path or set of rails 310 may disengage from the container and the container may continue to travel along a downstream path.

The helical container conveyance system 300 may be part of an inventory-handling system having an inventory unloader with guide rails spaced apart to contact opposing sides of the inventory containers. The inventory containers can be loaded with items and positioned for loading into the inventory unloader. The inventory unloader can receive the inventory containers between the guide rails (e.g., with the guide rails contacting opposing sides of the inventory containers). The guide rails can be curved to rotate the inventory containers as they advance through the inventory unloader. The inventory containers can be advanced through the inventory unloader with a drivetrain. The inventory containers can be received into the inventory unloader (e.g., between the guide rails) in an upright orientation. The inventory containers can be advanced through the inventory unloader (e.g., by the drivetrain) and the curvature of the guide rails can cause the inventory containers to rotate. The inventory containers can be rotated (e.g., by the curvature of the guide rails) from the upright orientation to an inverted (e.g., tipped-over, upended, or upturned) orientation. In the inverted orientation, the items can fall out of the inventory container, for example, onto an output conveyor. The inventory containers can continue to be advanced through the inventory unloader and rotated back to an upright orientation. The guide rails can be curved to rotate the inventory containers from the inverted orientation in the opposite direction the inventory containers were rotated from the upright orientation. For example, the inventory containers can be rotated 180 degrees counter-clockwise and then 180 degrees clockwise. However, the guide rails can rotate the inventory containers in the same direction they were rotated from the upright orientation to the inverted orientation. For example, the inventory containers can be rotated 360 degrees counter-clockwise. In the upright orientation, the inventory containers can be ejected from the inventory unloader. For example, the inventory containers can be ejected for use in a warehouse environment.

In FIG. 3, the container 310 may move from an upright position at a first portion of the set of rails 302 (e.g., at the top of the page in FIG. 3), to a rotated position 320 at a second portion of the set of rails 302, to an inverted position 330 at a third portion of the set of rails 302, to a rotated position and then back to an upright position 340 at a fourth portion of the set of rails 302. The container 310 may continue downstream along a fifth portion 350 of the set of rails 302.

The set of rails 302 may include a first crossover portion 370, a first straight portion 372, a second crossover portion 374, and a second straight portion 380 that together form a helical structure. The crossover portions may be used to rotate the container 310 as the container 310 moves along the rails.

The helical container conveyance system 300 may therefore optionally include a first container having a first item and a second item, the first container having a first lip disposed about an upper portion of the first container, and a second container having a third item, the second container having a second lip disposed about an upper portion of the second container. The helical container conveyance system 300 may include the conveyor 360 configured to receive the first item, the second item, and the third item. The helical container conveyance system 300 may include the set of rails 302 having a first rail and a second rail, the set of rails configured to engage the first lip of the first container and the second lip of the second container. As depicted in FIG. 3, the set of rails 302 may have a helical formation, such that the first container and the second container are rotated 360 degrees from an upright position to an inverted position to the upright position as the first container and the second container move along the set of rails, and the first item, the second item, and the third item fall from the respective first container and the second container onto the conveyor 360.

In some embodiments, the container conveyance system 300 may include a set of rails having a first rail and a second rail, where the set of rails forms a helical structure. Other embodiments may form a different spiral structure configured to rotate containers of different geometries or configurations. The set of rails may be configured to guide a container from an upright position at a first point along the set of rails to an inverted position at a second point along the set of rails, and may optionally be further configured to guide the container to the upright position at a third point along the set of rails, where the second point is disposed between the first point and the third point along the set of rails.

The helical container conveyance system 300 may include a drive mechanism 362 configured to propel the container along the set of rails 302. In some embodiments, the drive mechanism 362 may be coupled to the first rail, and the second rail may be a passive guide rail. In other embodiments, more than one rail may include a drive system or drive mechanism 362 configured to propel the first container and the second container along the set of rails. For example, the helical container conveyance system 300 may include a first drive mechanism, such as the drive mechanism 362, that is coupled to the first rail, and a second drive mechanism 364 coupled to the second rail, where the first drive mechanism 362 and the second drive mechanism 364 together propel the container along the set of rails. In some embodiments, the drive mechanism 362 may be configured to reciprocate or otherwise impart vibration to the container at a portion of the rails along which the container is inverted, such as the inverted position 330. For example, the drive mechanism 362 may reciprocate back and forth to shake the container and assist in freeing any jammed items in falling from the container onto the conveyor 360.

The conveyor 360 may be disposed under a portion of the set of rails 302 corresponding to the second point (e.g., when the container 310 is in the inverted position 330). The conveyor 360 may optionally have a cleated conveyance surface, so as to maintain separation between the contents of different containers that are unloaded onto the conveyor 360. For example, the conveyor 360 may include a set of cleats 366 separating the conveyor into segments, where the first item and the second item are separated from the third item by a cleat of the set of cleats 366. In other embodiments, the conveyor 360 may be coupled to an autonomous vehicle 368. One or more side guards 369 may be disposed about sides of the conveyor 360 to prevent items from falling off the conveyor during movement.

Figure 4:
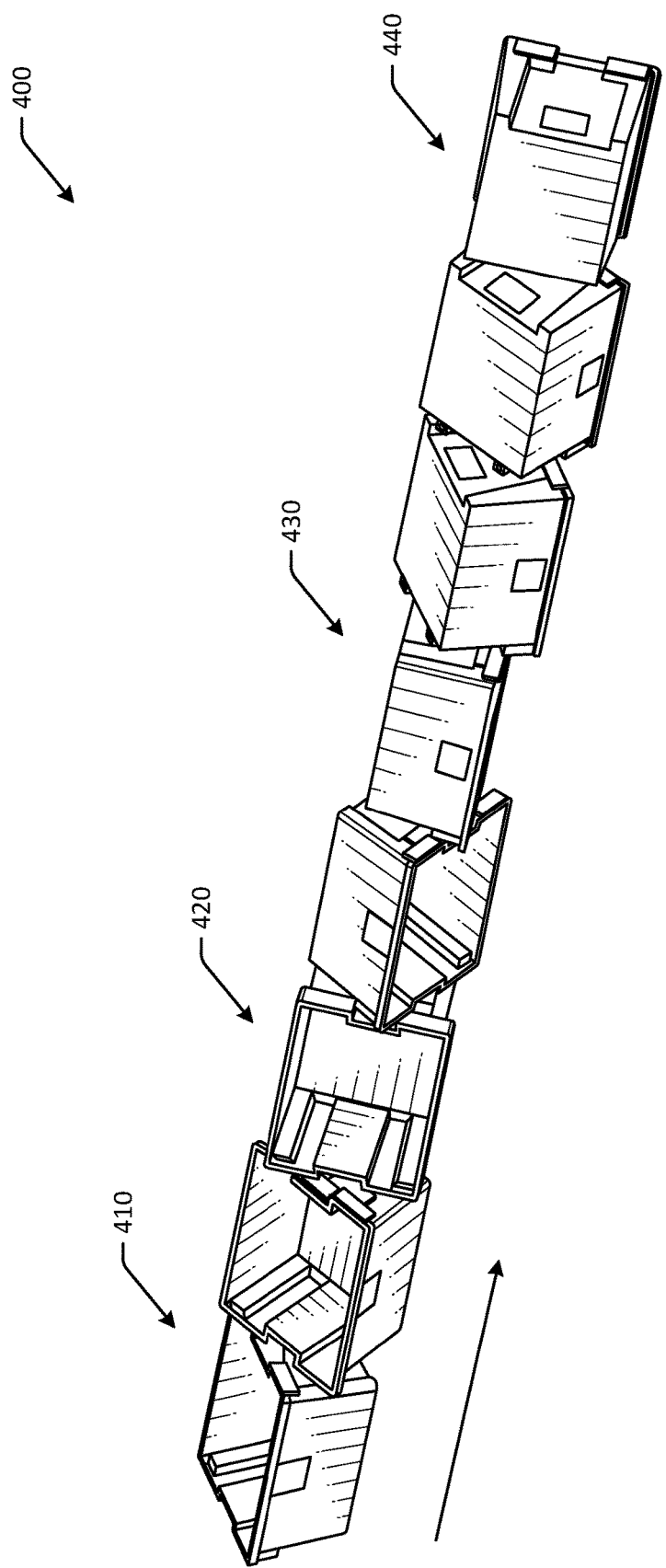
FIG. 4 is a schematic illustration of container movement during container unloading during use of the helical container conveyance system of FIG. 3 in accordance with one or more embodiments of the disclosure.

FIG. 4 is a schematic illustration of container movement 400 during container unloading during use of the helical container conveyance system of FIG. 3 in accordance with one or more embodiments of the disclosure. Other embodiments may include additional or fewer components. The illustration of FIG. 4 is not to scale, and may not be illustrated to scale with respect to other figures. The path of movement illustrated in FIG. 4 may be condensed and may be spread over a longer amount of rail space in other embodiments.

As depicted in FIG. 4, as a container moves along the set of rails of a helical container conveyance system, the container may be rotated 360 degrees as individual containers move along the set of rails, such that contents of the container are unloaded onto a conveyor disposed underneath the set of rails (e.g., a conveyor may be disposed under the portion of the set of rails where the container is at least partially inverted to receive items from the containers, etc.). A single container is depicted in various movement states in FIG. 4, although multiple containers may move along the set of rails at the same time. For example, containers may be spaced apart by a number of inches, where the spacing can be maintained while moving along the set of rails.

The container may move along the set of rails in the direction indicated by the arrow in FIG. 4. At a first point 410 along the set of rails, the container may be in an upright position. As the container moves along the set of rails to a second point 420, the container may begin to be rotated from the upright position towards an inverted position. As the container moves along the set of rails to a third point 430, the container may begin to be rotated to an almost inverted position, and then to the inverted position. As the container moves along the set of rails to a fourth point 440, the container may begin to be rotated from the inverted position towards the upright position. The container can therefore move from an upstream process, such as a container decanting process, to an unload process during travel on the set of rails, and then to a downstream process, such as a container refilling process.

Accordingly, items may be unloaded from the container during the container movement illustrated in FIG. 4. Containers can be received by an inventory unloader in an upright orientation (e.g., with an open side on top). The containers can be received between guides (e.g., the set of rails, etc.). The guides can contact opposing sides of the containers. For example, the guides can be spaced substantially the same distance as the width of the containers and can put pressure on the sides of the containers (e.g., to stabilize the containers). The containers can be advanced through the inventory unloader. For example, the containers can be advanced with the drivetrain. The containers can be rotated by the guides or rails. For example, the guides can be curved and advancing the containers can cause the containers to rub against the guides and follow the curvature of the guides to rotate to an inverted orientation (e.g., with the open side on the bottom). The containers can be rotated in a clockwise or counter-clockwise direction. The inventory items can be received on an output conveyor. The output conveyor can receive the inventory items from the open side of the inventory container. For example, the inventory items can fall out of the open side of the inventory container onto the output conveyor.

Figure 5A:
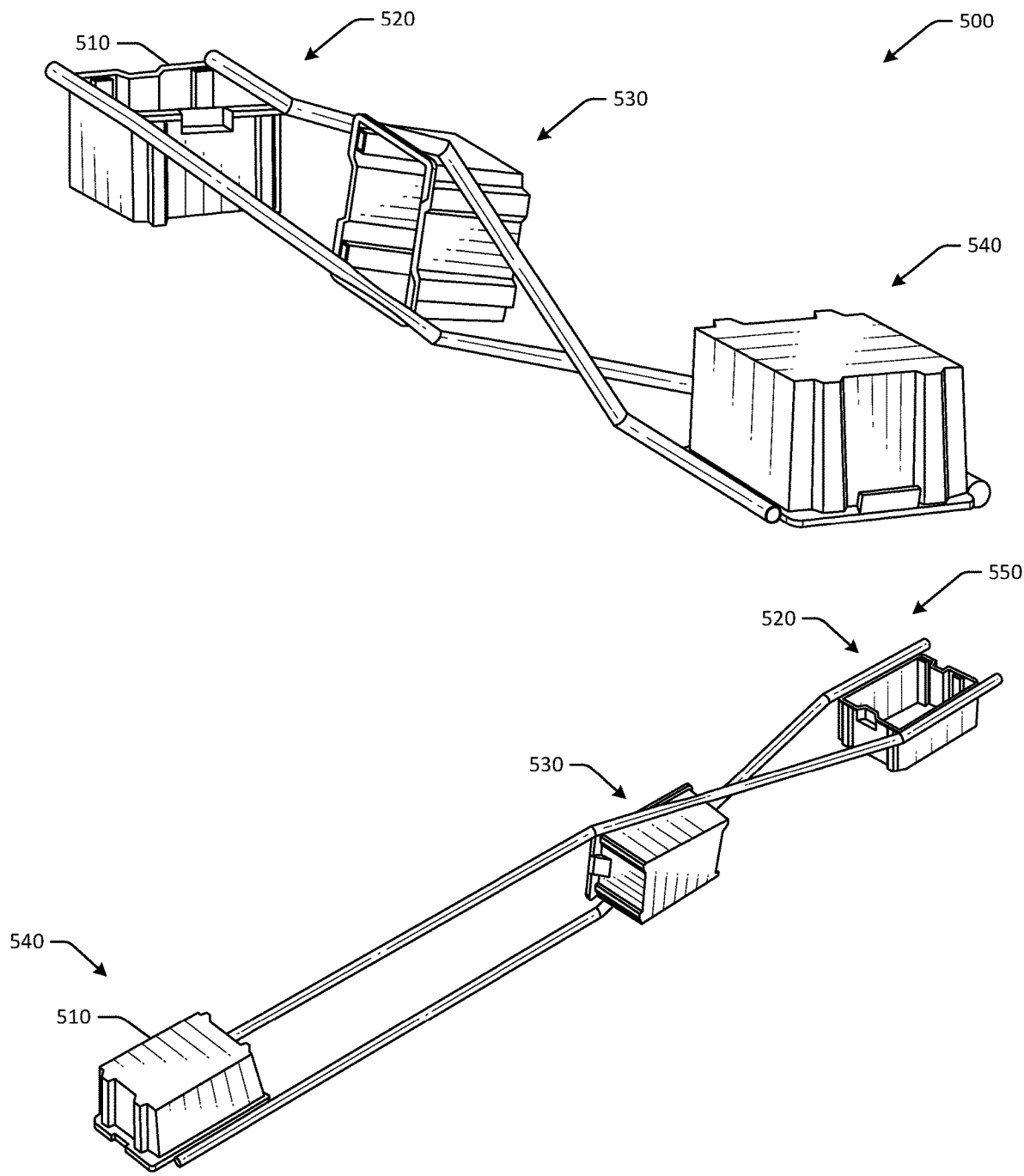
FIGS. 5A-5B are schematic illustrations of containers moving along a helical container conveyance system in accordance with one or more embodiments of the disclosure.
Figure 5B:
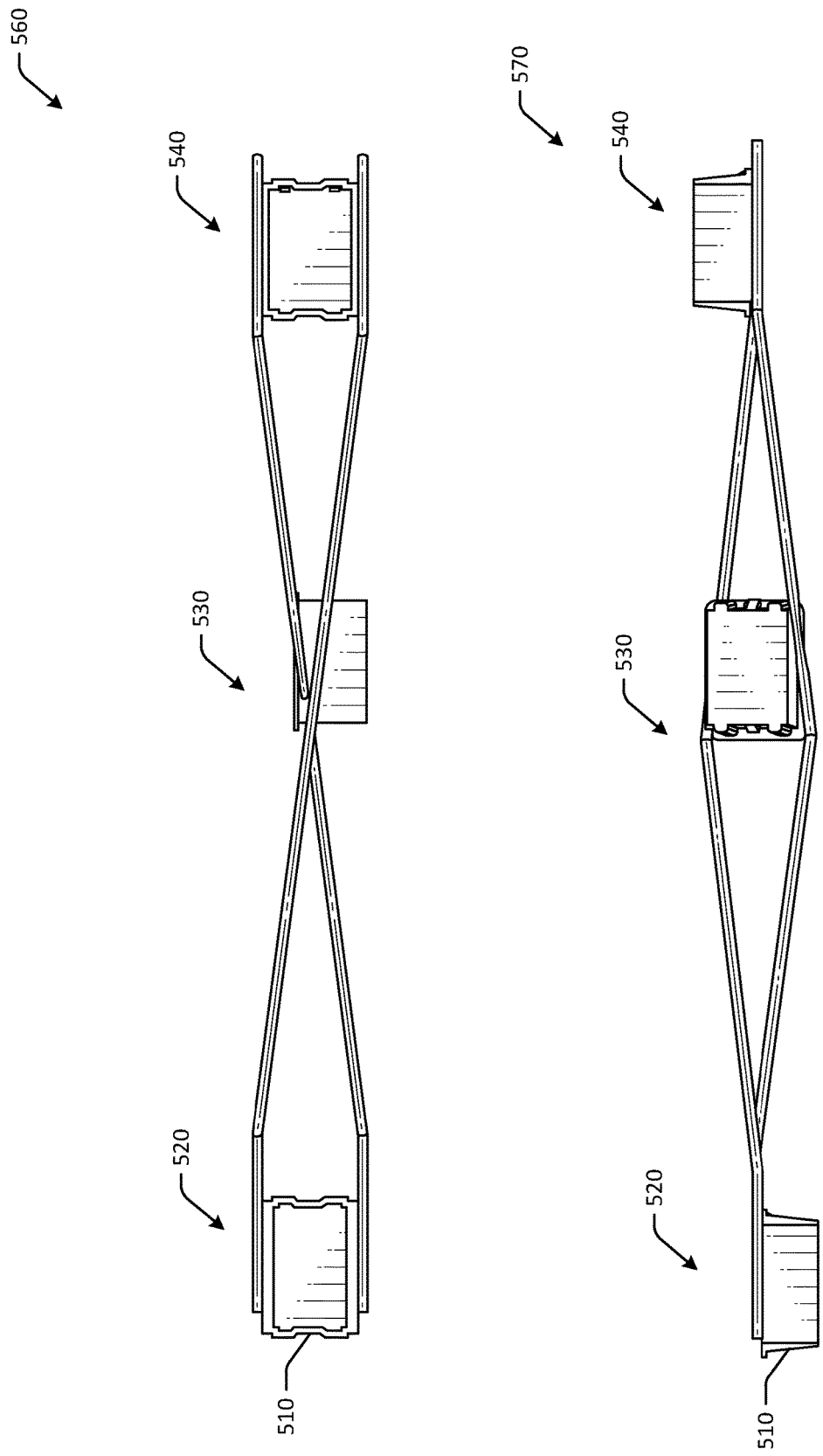

FIGS. 5A-5B are schematic illustrations of containers moving along a helical container conveyance system 500 in accordance with one or more embodiments of the disclosure. Other embodiments may include additional or fewer components. The illustrations of FIGS. 5A-5B may not be to scale, and may not be illustrated to scale with respect to other figures. The conveyance systems illustrated in FIGS. 5A-5B may be the same conveyance systems discussed with respect to FIGS. 1-4.

In FIGS. 5A-5B, a number of containers 510 may move along the helical container conveyance system 500, during which contents of the respective containers may be unloaded onto a conveyor or other surface. The helical container conveyance system 500 may include a number of portions, such as a first portion at which the container 510 is upright, a second portion 530 that forms a helical structure at which the container is rotated towards an inverted position, and a third portion 540 at which the container is in an inverted position. As depicted in perspective view 550, a number of containers may move along the helical container conveyance system 500 at the same time. The containers may be propelled by a drivetrain or other drive mechanism coupled to one or both the rails that form the set of rails of the helical container conveyance system 500.

In FIG. 5B, the helical container conveyance system 500 is depicted in a bottom view 560 and a side view 570. As the containers 510 move along the rails of the helical container conveyance system 500, the containers may gradually be rotated from an upright position to an inverted position, and then may subsequently be rotated to an upright position again, depending on downstream processes for the containers 510.

Figure 6A:
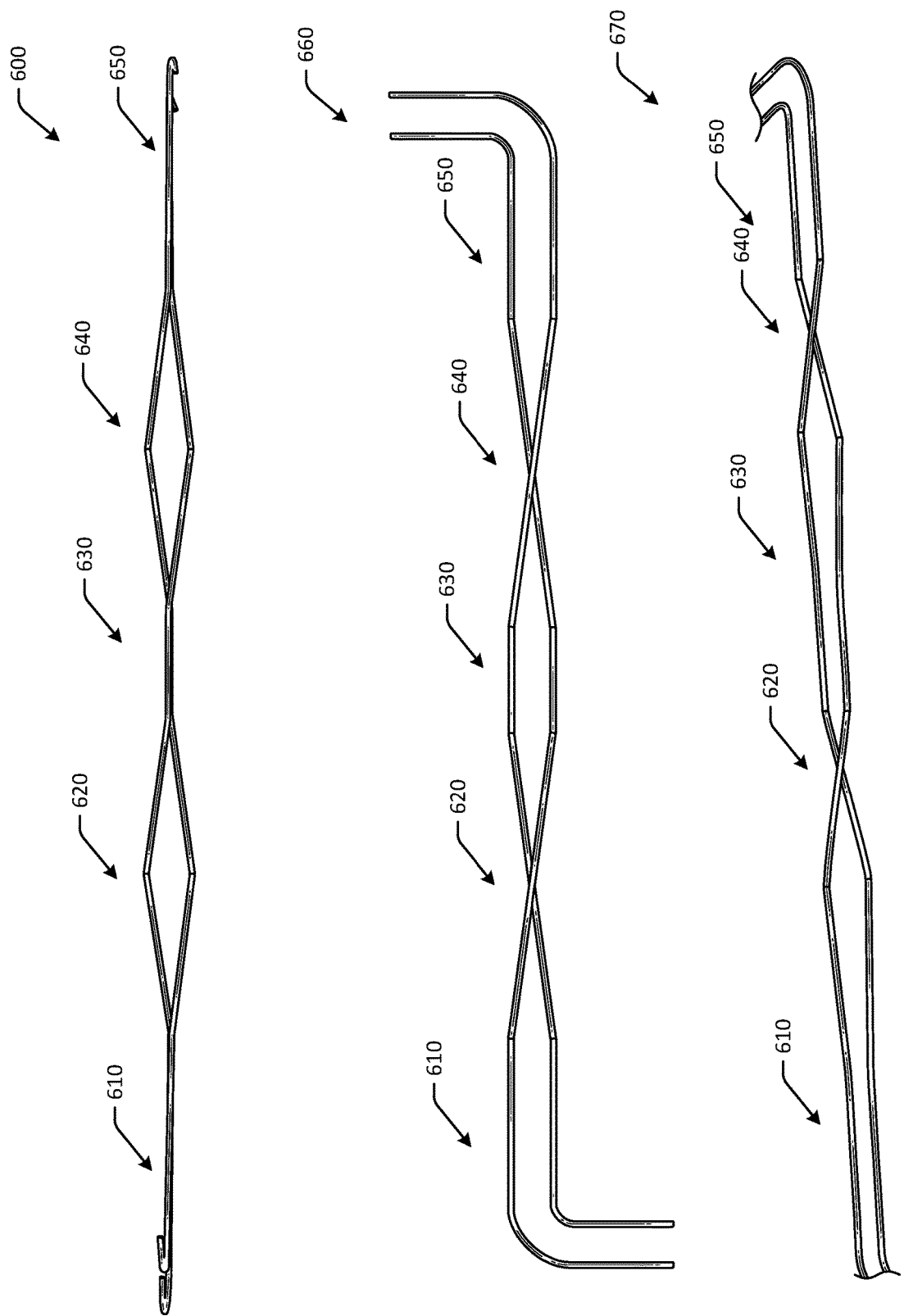

FIGS. 6A-6B are schematic illustrations of rails 600 of a helical container conveyance system without containers in accordance with one or more embodiments of the disclosure. Other embodiments may include additional or fewer components. The illustrations of FIGS. 6A-6B are not to scale, and may not be illustrated to scale with respect to other figures. The rails illustrated in FIGS. 6A-6B may be the same rails of a helical container conveyance system discussed with respect to FIGS. 1-5B.

In FIG. 6A, the set of rails 600 may include a first rail and a second rail configured to guide containers. Containers may be gripped by a lip of a container or other portion of the container and moved along the set of rails 600. One or more drive mechanisms may be coupled to one or both of the individual rails to propel containers along the set of rails 600. In instances where one drive mechanism is used, the opposing rail may be a passive guide rail and the drive mechanism may propel the container. The drive mechanism may be any suitable drive mechanism, such as a belt drive mechanism, a chain drive mechanism, an electromagnetic drive mechanism, an electric drive mechanism, and so forth, and may include one or more gripping components to engage a surface of the container to secure the container during movement.

As depicted in the side view, top view 660, and perspective view 670 of FIG. 6A, the set of rails 600 may form a helical structure. The helical structure may allow for the container to be rotated upside down and then back to a right side up orientation. The helical structure is depicted in front view 680 and perspective view 690 in FIG. 6B. Although depicted in the illustration of FIGS. 6A-6B as having hard angled edges, other embodiments may have curved rails with increased curvature (as opposed to edges) that form a symmetrical helical profile (e.g., not an irregular profile, etc.). The curved rails may not form angles at joints.

The set of rails 600 may include a first straight portion 610 in which the first rail and the second rail of the set of rails 600 are linearly arranged, a first crossover portion 620 in which the first rail and the second rail crossover each other, a second straight portion 630, a second crossover portion 640 in which the first rail and the second rail again crossover each other, and a third straight portion 650.

During the first crossover portion 620, a container may be rotated, such that the container is in an opposite orientation at the second straight portion 630 than at the first straight portion 610 (if the direction of travel is left to right in the example of FIG. 6A). During the second crossover portion 640, the container may be rotated, such that the container is in an opposite orientation at the third straight portion 650 than at the second straight portion 620 (if the direction of travel is left to right in the example of FIG. 6A). Accordingly, the contents may be emptied during the rotation of the container if the initial container orientation is upright. If the initial orientation is upside down, the container may be rotated upright during the rotation.

The first rail and the second rail of the set of rails 600 may switch sides relative to a conveyor disposed underneath the set of rails 600, so as to form the helical structure. For example, the first rail may be disposed at a first side of the conveyor when the container is in the upright position at the first point (e.g., the first straight portion 610), and the second rail is disposed at a second side of the conveyor when the container is in the upright position at the first point (e.g., the first straight portion 610). The first rail may be disposed at the second side of the conveyor when the container is in the inverted position at the second point (e.g., the second straight portion 630), and the second rail is disposed at the first side of the conveyor when the container is in the inverted position at the second point (e.g., the second straight portion 630).

One or more operations of the methods, process flows, or use cases of FIGS. 1-6B may have been described above as being performed by a user device, or more specifically, by one or more program module(s), applications, or the like executing on a device. It should be appreciated, however, that any of the operations of the methods, process flows, or use cases of FIGS. 1-6B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6B may be described in the context of the illustrative devices, it should be appreciated that such operations may be implemented in connection with numerous other device configurations.

The operations described and depicted in the illustrative methods, process flows, and use cases of FIGS. 1-6B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
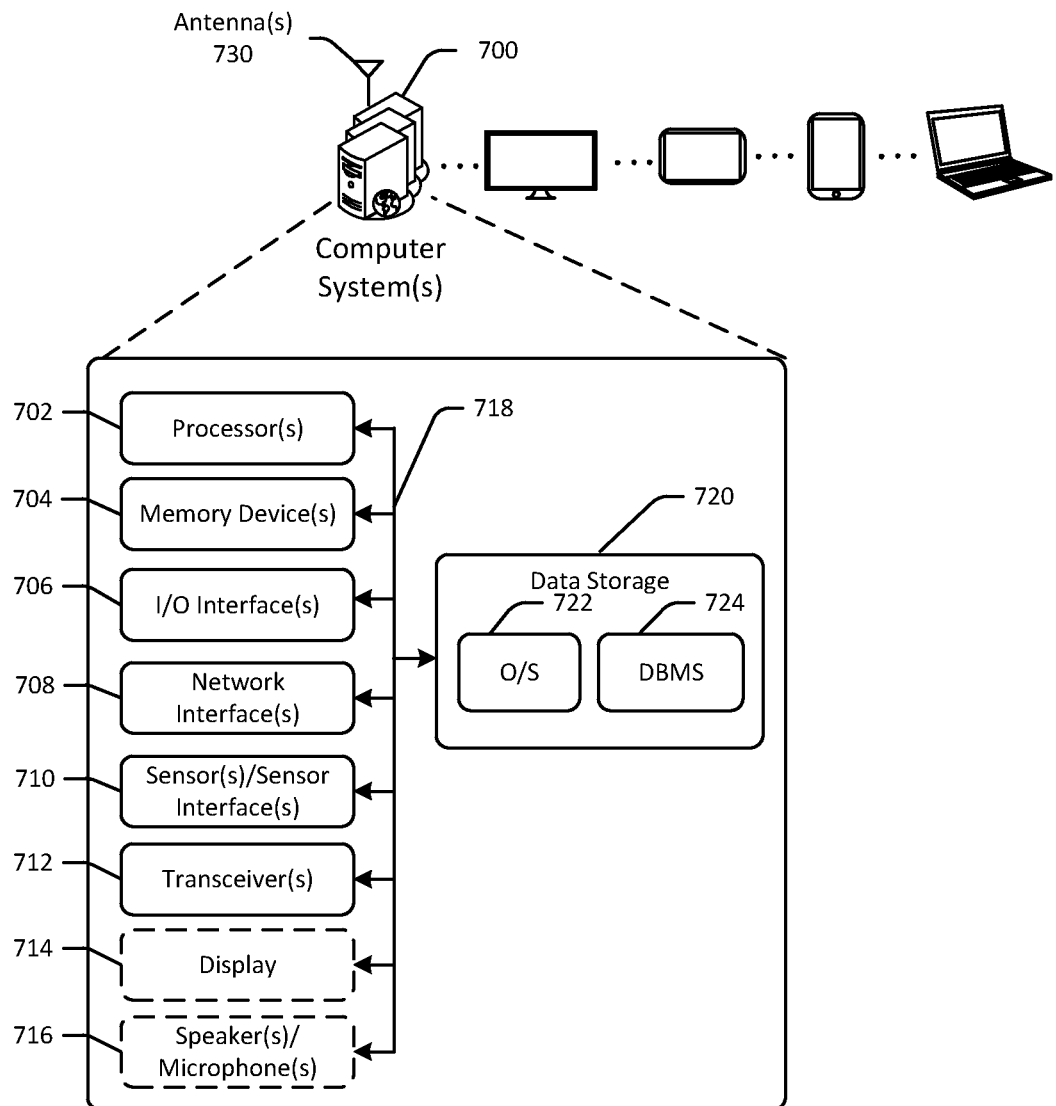
FIG. 7 schematically illustrates an example architecture of a computer system associated with a container unloading system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) or computer system(s) of FIGS. 1-6B.

The computer system(s) 700 may be configured to communicate with one or more servers, user devices, or the like. The computer system(s) 700 may be configured to control container movement systems, sortation system components, and/or automated module movement systems.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals.

The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container conveyance system comprising:
    a first container having a first item and a second item, the first container comprising a first lip disposed about an upper portion of the first container;
    a second container having a third item, the second container comprising a second lip disposed about an upper portion of the second container;
    a conveyor configured to receive the first item, the second item, and the third item;
    a set of rails comprising a first rail and a second rail, the set of rails configured to engage the first lip of the first container and the second lip of the second container; and
    a drive system coupled to the first rail of the set of rails, wherein the drive system is configured to propel the first container and the second container along the set of rails, wherein the second rail is a passive guide rail;
    wherein the set of rails comprises a helical formation, such that the first container and the second container are rotated 360 degrees from an upright position to an inverted position to the upright position as the first container and the second container move along the set of rails, and wherein the first item, the second item, and the third item fall from the respective first container and the second container onto the conveyor.

2. The container conveyance system of claim 1, wherein the first rail is disposed at a first side of the conveyor when the first container is in the upright position, and the second rail is disposed at a second side of the conveyor when the first container is in the upright position; and
    wherein the first rail is disposed at the second side of the conveyor when the first container is in the inverted position, and the second rail is disposed at the first side of the conveyor when the first container is in the inverted position.

3. The container conveyance system of claim 1, wherein the conveyor comprises a set of cleats separating the conveyor into segments, and wherein the first item and the second item are separated from the third item by a cleat of the set of cleats.

4. A container conveyance system comprising:
    a set of rails comprising a first rail and a second rail, the set of rails configured to guide a container from an upright position at a first point along the set of rails to an inverted position at a second point along the set of rails;
    a drive mechanism configured to propel the container along the set of rails, wherein the drive mechanism is coupled to the first rail, and wherein the second rail is a passive guide rail; and
    a conveyor disposed under a portion of the set of rails corresponding to the second point.

5. The container conveyance system of claim 4, wherein the set of rails is further configured to guide the container to the upright position at a third point along the set of rails, wherein the second point is disposed between the first point and the third point along the set of rails.

6. The container conveyance system of claim 4, wherein the first rail is disposed at a first side of the conveyor when the container is in the upright position at the first point, and the second rail is disposed at a second side of the conveyor when the container is in the upright position at the first point; and
    wherein the first rail is disposed at the second side of the conveyor when the container is in the inverted position at the second point, and the second rail is disposed at the first side of the conveyor when the container is in the inverted position at the second point.

7. The container conveyance system of claim 4, wherein the set of rails forms a helical structure.

8. The container conveyance system of claim 4, wherein containers are rotated 360 degrees as individual containers move along the set of rails.

9. The container conveyance system of claim 4, wherein the conveyor comprises a cleated conveyance surface.

10. The container conveyance system of claim 4, wherein the conveyor is coupled to an autonomous vehicle.

11. The container conveyance system of claim 4, further comprising:
one or more side guards disposed about sides of the conveyor.

12. The container conveyance system of claim 4, wherein the drive mechanism is configured to reciprocate at the second point to impart vibration to the container.

13. The container conveyance system of claim 4, wherein the drive mechanism is a first drive mechanism that is coupled to the first rail, the container conveyance system further comprising:
a second drive mechanism coupled to the second rail, wherein the first drive mechanism and the second drive mechanism together propel the container along the set of rails.

14. A system comprising:
a set of rails comprising a first rail and a second rail that form a helical structure, the set of rails configured to guide a container from an upright position at a first point along the set of rails to an inverted position at a second point along the set of rails to the upright positon at a third point along the set of rails;
a drive mechanism configured to propel the container along the set of rails, wherein the drive mechanism is coupled to the first rail, and wherein the second rail is a passive guide rail; and
a conveyor disposed under a portion of the set of rails corresponding to the second point.

15. The system of claim 14, wherein the first rail is disposed at a first side of the conveyor when the container is in the upright position at the first point, and the second rail is disposed at a second side of the conveyor when the container is in the upright position at the first point; and
wherein the first rail is disposed at the second side of the conveyor when the container is in the inverted position at the second point, and the second rail is disposed at the first side of the conveyor when the container is in the inverted position at the second point.

16. The system of claim 14, wherein containers are rotated 360 degrees as individual containers move along the set of rails.

17. The system of claim 14, wherein the drive mechanism is a first drive mechanism that is coupled to the first rail, the container conveyance system further comprising:
a second drive mechanism coupled to the second rail, wherein the first drive mechanism and the second drive mechanism together propel the container along the set of rails.

* * * * *